(12) United States Patent
Ogata et al.

(10) Patent No.: US 7,477,031 B2
(45) Date of Patent: Jan. 13, 2009

(54) CONTROL DEVICE FOR HYBRID ELECTRIC VEHICLE

(75) Inventors: Makoto Ogata, Kanagawa (JP); Tatsuo Kiuchi, Kanagawa (JP)

(73) Assignee: Mitsubishi Fuso Truck and Bus Corporation, Kanagawa (JP)

( * ) Notice: Subject to any disclaimer, the term of this patent is extended or adjusted under 35 U.S.C. 154(b) by 117 days.

(21) Appl. No.: 11/709,238

(22) Filed: Feb. 22, 2007

(65) Prior Publication Data

US 2007/0205036 A1 Sep. 6, 2007

(30) Foreign Application Priority Data

Feb. 22, 2006 (JP) .............................. 2006-045347
Mar. 1, 2006 (JP) .............................. 2006-054847

(51) Int. Cl.
*H02P 1/04* (2006.01)

(52) U.S. Cl. ..................... 318/430; 318/139; 318/432; 318/434; 318/400.15; 180/65.1; 180/65.2; 180/65.3; 701/22; 701/70

(58) Field of Classification Search ................ 318/139, 318/430, 432, 434, 400.15; 701/22, 51, 70; 180/65.1, 65.2, 65.3
See application file for complete search history.

(56) References Cited

U.S. PATENT DOCUMENTS 6,679,807 B2 * 1/2004 Kato et al. .................. 477/107
6,859,693 B2 * 2/2005 Tamagawa et al. ............ 701/22
7,079,933 B2 * 7/2006 Kano et al. ................... 701/67
7,099,757 B2 * 8/2006 Niki et al. .................... 701/22
7,216,943 B2 * 5/2007 Nishikawa et al. .......... 303/152

FOREIGN PATENT DOCUMENTS

| JP | 05 176405   | 7/1993 |
| JP | 2000 224713 | 8/2000 |
| JP | 2001-054202 | 2/2001 |
| JP | 2003-002086 | 1/2003 |
| JP | 2004-251452 | 9/2004 |

* cited by examiner

*Primary Examiner*—Paul Ip
(74) *Attorney, Agent, or Firm*—Jacobson Holman PLLC

(57) ABSTRACT

A hybrid electric vehicle is arranged such that a driving force of an engine and a driving force of an electric motor can be transmitted to driving wheels through a transmission and that the engine and the transmission can be mechanically connected and disconnected by means of a clutch. When an upper limit decelerating torque generable by the electric motor is equal to or greater than a requested decelerating torque, a vehicle ECU disengages the clutch and controls the electric motor to generate the requested decelerating torque. Meanwhile, when the upper limit decelerating torque is smaller than the requested decelerating torque, the vehicle ECU engages the clutch and controls the engine and the electric motor so that the sum of a decelerating torque generated by the engine and a decelerating torque generated by the electric motor is equal to the requested decelerating torque.

7 Claims, 5 Drawing Sheets

CONTROL DEVICE FOR HYBRID ELECTRIC VEHICLE

BACKGROUND OF THE INVENTION

1. Field of the Invention

This invention relates to a control device for a hybrid electric vehicle, and particularly a control device for a hybrid electric vehicle arranged such that a driving force of an engine and a driving force of an electric motor can be transmitted to the driving wheels of the vehicle.

2. Description of the Related Art

A so-called parallel hybrid electric vehicle capable of transmitting a driving force of an engine and a driving force of an electric motor to the driving wheels of the vehicle has been developed and already come into practical use.

Such a parallel hybrid electric vehicle is proposed in Japanese Unexamined Patent Publication No. 5-176405 (hereinafter referred to as Patent Document 1), for example. The parallel hybrid electric vehicle proposed comprises a clutch for mechanically connecting/disconnecting the engine and an automatic transmission, and the rotary shaft of the electric motor is connected between the output shaft of the clutch and the input shaft of the automatic transmission.

In the hybrid electric vehicle as shown in Patent Document 1, when the vehicle is to start traveling, the clutch is disengaged and the electric motor is operated as a motor with power supply from a battery, so that the vehicle starts traveling only on the driving force of the electric motor. In the traveling of the vehicle after the start, the clutch is engaged, so that the driving force of the engine can be transmitted to the driving wheels through the transmission.

Meanwhile, in deceleration of the vehicle, the electric motor is operated as an electric generator to produce a regenerative braking force, and regenerative braking energy is converted into electric power to charge the battery.

When the hybrid electric vehicle is decelerating with the accelerator pedal released and with the brake of the vehicle not operating, it is desirable to control the electric motor and the engine to produce a deceleration almost equal to the deceleration which a vehicle of a similar level but provided with only an engine as a power source produces in similar deceleration. By controlling the electric motor and the engine like this, giving a uncomfortable feeling to the driver can be avoided, and lowering of a driving feeling can be prevented.

A control device for a hybrid electric vehicle designed to control the engine and the electric motor to obtain a desired vehicle deceleration is proposed in Japanese Unexamined Patent Publication No. 2000-224713 (hereinafter referred to as Patent Document 2), for example.

The hybrid electric vehicle disclosed in Patent Document 2 has an arrangement such that an electric motor is disposed between a torque converter and an engine, and the output shaft of the engine is connected with the rotary shaft of the electric motor.

In such an arrangement as the hybrid electric vehicle of Patent Document 2, the driving shaft of the engine is always connected with the rotary shaft of the electric motor. Thus, part of rotational energy of the driving wheels in vehicle deceleration is always consumed by the engine, so that the energy recovery efficiency lowers by the amount consumed.

In order to prevent the engine from producing a decelerating torque to increase the energy recovery efficiency in vehicle deceleration, the engine needs to be operated by supplying fuel. In this case, however, fuel is consumed in order to increase the energy recovery efficiency, which leads rather to degradation in fuel economy.

In the hybrid electric vehicle in which a clutch for mechanically connecting/disconnecting the engine and the automatic transmission is provided and the rotary shaft of the electric motor is connected between the output shaft of the clutch and the input shaft of the automatic transmission, as disclosed in Patent Document 1, it is possible to decelerate the vehicle only by the regenerative braking torque of the electric motor, and accordingly, it is possible to increase the energy recovery efficiency. The electric motor has, however, a characteristic that the decelerating torque produced by the electric motor tends to decrease as the revolution speed increases. Thus, an attempt to obtain a sufficient decelerating torque from the electric motor even at high revolving speeds leads to problems such as an increase in size of the electric motor, an increase in weight of the vehicle, and an increase in the space occupied by the electric motor within the vehicle.

SUMMARY OF THE INVENTION

An aspect of the present invention is directed to a control device for a hybrid electric vehicle arranged such that a driving force of an engine and a driving force of an electric motor can be transmitted to driving wheels through a transmission and that the engine and the transmission can be mechanically connected and disconnected by means of a clutch, comprising a revolution speed detection means for detecting revolution speed of the electric motor; and a control means which, in deceleration of the vehicle, sets an upper limit decelerating torque generable by the electric motor and a requested decelerating torque to be obtained from the engine and the electric motor, on the basis of a revolution speed detected by the revolution speed detection means, and when the upper limit decelerating torque is equal to or greater than the requested decelerating torque, disengages the clutch and controls the electric motor to generate the requested decelerating torque, and when the upper limit decelerating torque is smaller than the requested decelerating torque, engages the clutch and controls the engine and the electric motor so that the sum of a decelerating torque generated by the engine and a decelerating torque generated by the electric motor is equal to the requested decelerating toque.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

A first embodiment of the present invention will be described below with reference to the attached drawings.

Figure 1:
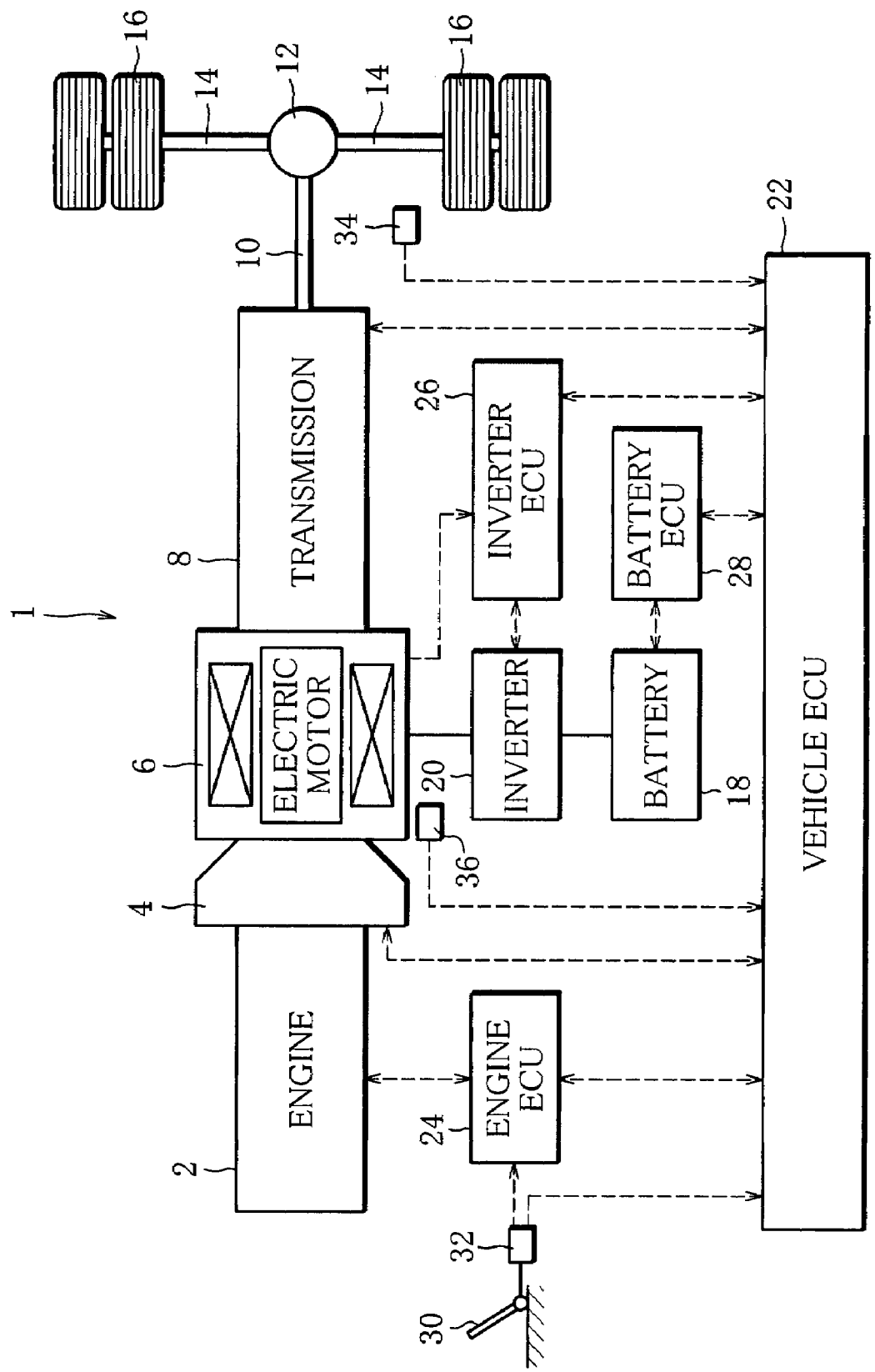
FIG. 1 is a diagram showing a schematic structure of a hybrid electric vehicle having a control device according to first and second embodiments of the present invention.

FIG. 1 is a diagram showing the schematic structure of a hybrid electric vehicle 1 to which the present invention is applied.

An input shaft of a clutch 4 is coupled to an output shaft of an engine 2, which is a diesel engine. An output shaft of the clutch 4 is coupled to an input shaft of an automatic transmission (hereinafter, referred to as transmission) 8 having five forward gears (hereinafter, referred to simply as gears) through a rotary shaft of a permanent-magnetic synchronous motor (hereinafter referred to as electric motor) 6. An output shaft 8 of the transmission 8 is connected to left and right driving wheels 16 through a propeller shaft 10, a differential gear unit 12 and driving shafts 14.

When the clutch 4 is engaged, both the output shaft of the engine 2 and the rotary shaft of the electric motor 6 can be mechanically connected with the driving wheels 16. When the clutch 4 is disengaged, only the rotary shaft of the electric motor 6 can be mechanically connected with the driving wheels 16.

The electric motor 6 is operated as a motor when DC power stored in a battery 18 is supplied to the electric motor 6 after being converted into AC power by an inverter 20. A driving torque of the electric motor is transmitted to the driving wheels 16 after being shifted to a proper speed by the transmission 8. At the time of deceleration of the vehicle, the electric motor 6 is operated as a generator. Kinetic energy created by the revolution of the driving wheels 16 is transmitted to the electric motor 6 through the transmission 8 to be converted into AC power, thereby producing a decelerating torque based on a regenerative braking force. This AC power is converted into DC power by the inverter 20 and is then charged to the battery 18. In this manner, the kinetic energy created by the revolution of the driving wheels 16 is recovered as electrical energy.

Meanwhile, when the clutch 4 is engaged, a driving torque of the engine 2 is transmitted to the transmission 8 through the rotary shaft of the electric motor 6. After being shifted to a proper speed, the driving torque of the engine 2 is transmitted to the driving wheels 16. Accordingly, if the electric motor 6 is operated as a motor while the driving torque of the engine 2 is transmitted to the driving wheels 16, both the driving torque of the engine 2 and the driving torque of the electric motor 6 are transmitted to the driving wheels 16. In other words, a part of the driving torque to be transmitted to the driving wheels 16 to drive the vehicle is supplied from the engine 2, and at the same time, the rest of the driving torque is supplied from the electric motor 6.

If a storage rate (hereinafter, referred to as SOC) of the battery 18 lowers, and the battery 18 then needs to be charged, the electric motor 6 is operated as a generator. Moreover, the electric motor 6 is driven by using a part of driving torque of the engine 2, to thereby carry out power generation. The AC power thus generated is converted into DC power by the inverter 20, and the battery 18 is charged with this DC power.

A vehicle ECU 22 (control means) implements engagement/disengagement control of the clutch 4 and gear shift control of the transmission 8 according to an operating state of the vehicle, an operating state of the engine 2, and information from an engine ECU 24, an inverter ECU 26, a battery ECU 28, etc. The vehicle ECU 22 also performs an integrated control for properly controlling the engine 2 and the electric motor 6 according to state of the above-mentioned controls, and the various kinds of states, such as start, acceleration, and deceleration of the vehicle.

The hybrid electric vehicle 1 is provided with an accelerator opening sensor 32 for detecting the depression amount of an accelerator pedal 30, a vehicle speed sensor 34 for detecting the traveling speed of the vehicle, and a revolution speed sensor (revolution speed detection means) 36 for detecting the revolution speed of the electric motor 6. When performing the above-mentioned controls, the vehicle ECU 22 calculates a total driving torque required for the traveling of the vehicle, and a total decelerating torque to be generated by the engine 2 and the electric motor 6 in deceleration of the vehicle, on the basis of the detection results supplied from the accelerator opening sensor 32, the vehicle speed sensor 34 and the revolution speed sensor 36. The vehicle ECU 22 sets a torque to be generated by the engine 2 and a torque to be generated by the electric motor 6, on the basis of the total driving torque and the total decelerating torque.

The engine ECU 24 performs various kinds of controls required for the operation of the engine 2 per se, including start/stop control and idle control of the engine 2, regeneration control of an exhaust gas purifying device (not shown), and the like. Further, the engine ECU 24 controls fuel injection quantity, fuel injection timing, etc. for the engine 2 so that the engine 2 generates the torque required in the engine 2, which has been set by the vehicle ECU 22.

The inverter ECU 26 controls the inverter 20 based on the torque to be generated by the electric motor 6, which has been set by the vehicle ECU 22, and thereby controls the electric motor 6 to be operated as a motor or as a generator.

The battery ECU 28 detects the temperature of the battery 18, the voltage of the battery 18, a current flowing between the inverter 20 and the battery 18, etc. The battery ECU 28 obtains the SOC of the battery 18 from these detection results, and transmits the obtained SOC to the vehicle ECU 22, together with the detection results.

The outline of controls performed mainly by vehicle ECU 22, in the hybrid electric vehicle 1 arranged as described above, to make the vehicle travel is as follows:

First, it is assumed that the vehicle is at rest with the engine 2 stopped. When the driver operates a starter switch (not shown) to start the engine 2, with a shift change lever (not shown) in neutral position, the vehicle ECU 22 confirms that the transmission 8 is in neutral position so that the electric motor 6 and the driving wheels 16 are mechanically disconnected, and that the clutch 4 is engaged. Then the vehicle ECU 22 indicates to the inverter ECU 26 a driving torque of the electric motor 6 required for starting the engine 2, and commands the engine ECU 24 to operate the engine 2.

The inverter ECU 26 operates the electric motor 6 as a motor to generate a driving torque based on the indication from the vehicle ECU 22, thereby cranking the engine 2. At this time, the engine ECU 24 starts supply of fuel to the engine 2, thereby causing the engine 2 to start. After starting the engine 2, the engine 2 idles.

After the engine 2 is started in the above-described manner, when the vehicle is at rest, the engine 2 is in the idle operation state. When the driver puts the shift change lever in drive position or the like, the clutch 4 is disengaged. Furthermore, when the driver Steps on the accelerator pedal 30, the vehicle ECU 22 sets a driving torque of the electric motor 6 required to start traveling of the vehicle in accordance with the depression amount of the accelerator pedal 30 detected by the accelerator opening sensor 32.

The inverter ECU 26 controls the inverter 20 according to the torque set by the vehicle ECU 22, so that DC power of the battery 18 is converted into AC power by the inverter 20 and supplied to the electric motor 6. Supplied with AC power, the electric motor 6 is operated as a motor to generate a driving torque. The driving torque of the electric motor 6 is transmitted to the driving wheels 16 through the transmission 8, and the vehicle thereby starts traveling.

After the start, when the vehicle accelerates so that the revolution speed of the electric motor 6 increases to the vicinity of the idle-speed of the engine 2, the vehicle ECU 22 engages the clutch 4. At this time, the vehicle ECU 22 obtains a total driving torque required for further acceleration of the vehicle and traveling after the acceleration, on the basis of the depression amount of the accelerator pedal 30 detected by the accelerator opening sensor 32 and the traveling speed of the vehicle detected by the vehicle speed sensor 34. The vehicle ECU 22 appropriately divides the total driving torque between the engine 2 and the electric motor 6, depending on the operating state of the vehicle, thereby setting a torque to be generated by the engine 2 and a driving torque to be generated by the electric motor 6. The vehicle ECU 22 indicates to the engine ECU 24 the driving torque to be generated by the engine 2 and to the inverter ECU 26 the driving torque to be generated by the electric motor 6.

Upon receipt of these indications, the engine ECU 24 and the inverter ECU 26 control the engine 2 and the electric motor 6, respectively. Consequently, the driving torque generated by the engine 2 and the driving torque generated by the electric motor 6 are transmitted to the driving wheels 16 through the transmission 8 so that the vehicle travels. In this process, the vehicle ECU 22 appropriately performs a gear shift control of the transmission 8, depending on the vehicle operating state variables, such as the depression amount of the accelerator pedal 30 detected by the accelerator opening sensor 32 and the traveling speed detected by the vehicle speed sensor 34. The vehicle ECU 22 also commands the engine ECU 24 and the inverter ECU 26 to appropriately control the torque of the engine 2 and the torque of the electric motor 6 in response to the gear shift.

Next, how the deceleration of the vehicle is performed will be described.

Figure 2:
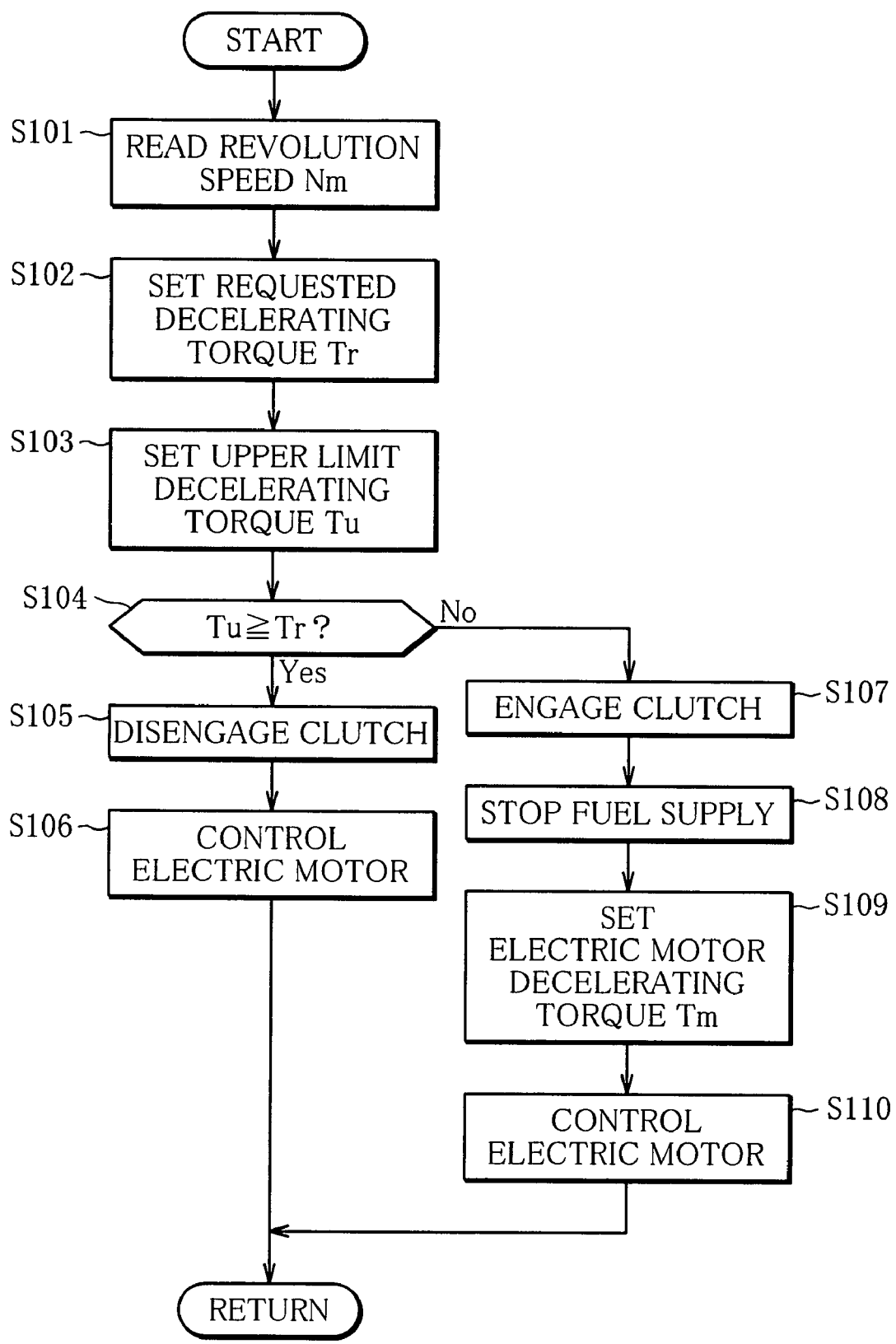
FIG. 2 is a flow chart showing a control routine for deceleration, performed in the first embodiment.

When the accelerator pedal 30 is released, the vehicle ECU 22 performs a control routine for deceleration according to a flow chart of FIG. 2, at intervals of a predetermined period.

First at Step S101, the vehicle ECU 22 reads a revolution speed Nm of the electric motor 6 detected by the revolution speed sensor 36, and then at Step S102, sets a requested decelerating torque Tr corresponding to the revolution speed Nm of the electric motor 6 read at Step S101.

Figure 3:
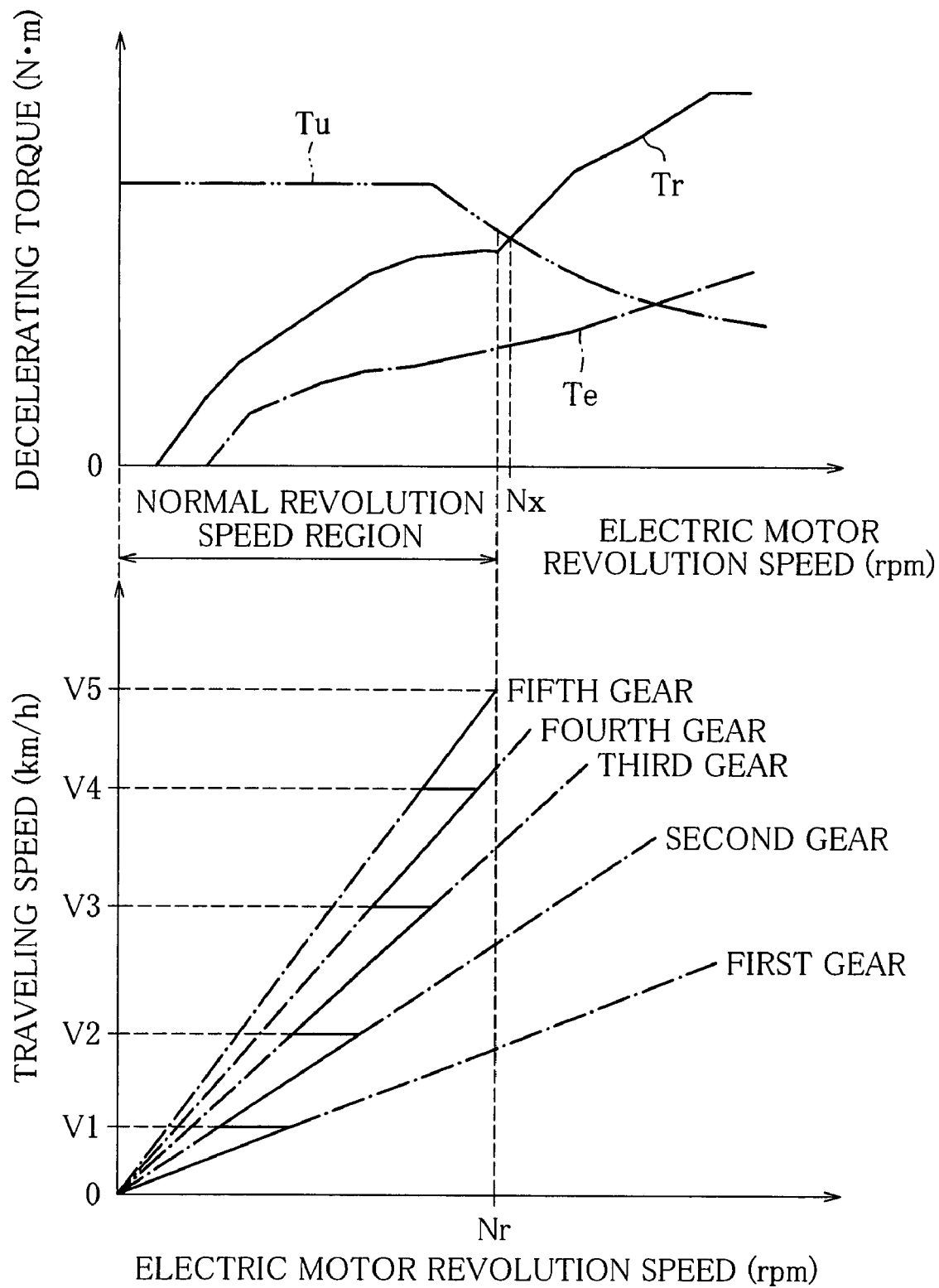
FIG. 3 is a diagram showing a relation between upper limit decelerating torque, requested decelerating torque, and decelerating torque of an engine, used in the first embodiment, and also showing, in a manner associated with the this relation, how the revolution speed of an electric motor changes as the traveling speed of a vehicle decreases in vehicle deceleration.

The requested decelerating torque Tr is a total decelerating toque to be obtained from the engine 2 and the electric motor 6 in deceleration of the hybrid electric vehicle 1. The requested decelerating torque Tr, which is torque required to obtain an appropriate vehicle deceleration, is set in advance relative to the revolution speed of the electric motor 6, and stored in the vehicle ECU 22. The relation between the requested decelerating torque Tr and the revolution speed of the electric motor 6 is as shown in solid line in the upper graph of FIG. 3. As seen in FIG. 3, the requested decelerating torque Tr increases as the revolution speed of the electric motor 6 increases.

Next at Step S103, the vehicle ECU 22 sets an upper limit decelerating torque Tu corresponding to the revolution speed of the electric motor 6 read at Step S101. The upper limit decelerating torque Tu is maximum decelerating torque generable by the electric motor 6, which depends on the specifications of the electric motor 6. The upper limit decelerating torque Tu is set in advance relative to the revolution speed of the electric motor 6 and stored in the vehicle ECU 22. The relation between the upper limit decelerating torque Tu and the revolution speed of the electric motor 6 is as shown in two-dot chain line in the upper graph of FIG. 3. As seen in FIG. 3, the upper limit decelerating torque Tu is constant on the lower revolution speed side, and gradually decreases along with the increase of the revolution speed of the electric motor 6 on the higher revolution speed side.

As seen in FIG. 3, the requested decelerating torque Tr is equal to the upper limit decelerating torque Tu at a revolution speed Nx (predetermined revolving speed) of the electric motor 6, smaller than the upper limit decelerating torque Tu at revolution speeds below Nx, and greater than the upper limit decelerating torque Tu at revolution speeds above Nx.

After setting the requested decelerating torque Tr and upper limit decelerating torque Tu according to the revolution speed of the electric motor 6 at Steps S102 and S103, the vehicle ECU 22 judges, at Step S104, whether or not the upper limit decelerating torque Tu is equal to or greater than the requested decelerating torque Tr.

If, at Step S104, the vehicle ECU 22 judges that the upper limit decelerating torque Tu is equal to or greater than the requested decelerating torque Tr, the vehicle ECU 22 disengages the clutch 4 at Step S105, and then at Step S106, commands the inverter ECU 26 to control the electric motor 6 so that the decelerating torque generated by the regenerative braking of the electric motor 6 is equal to the requested decelerating torque Tr set at Step S102.

In the present case, the upper limit decelerating torque Tu, namely the maximum decelerating torque generable by electric motor 6 is equal to or greater than the requested decelerating torque Tr. Thus, by decelerating the hybrid electric vehicle 1 by generating a decelerating torque equal to the requested decelerating torque Tr only by means of the electric motor 6, an appropriate vehicle deceleration is produced, allowing the kinetic energy of the driving wheels 16 to be recovered to a maximum extent, thereby increasing the energy recovery efficiency.

After the present control cycle is finished this way, the next control cycle is performed from Step S101 again. Specifically, the vehicle ECU 22 reads a revolution speed Nm of the electric motor 6 detected by the revolution speed sensor 36 at Step S101, and then at Steps S102 and S103, sets a requested decelerating torque Tr and an upper limit decelerating torque Tu corresponding to the revolution speed of the electric motor.

At Step S104, the vehicle ECU 22 again judges whether or not the upper limit decelerating torque Tu is equal to or greater than the requested decelerating torque Tr. If the upper limit decelerating torque Tu is still equal to or greater than the requested decelerating torque Tr, the vehicle ECU 22 keeps the clutch 4 disengaged and decelerates the hybrid electric vehicle 1 only by the decelerating torque of the electric motor 6 in the above-described manner.

Since it is arranged such that when the upper limit decelerating torque Tu is equal to or greater than the requested decelerating torque Tr, the clutch 4 is disengaged so that the requested decelerating torque Tr is obtained only from the decelerating torque of the electric motor 6, the electric motor 6 can recover the energy to a maximum extent during the deceleration of the vehicle. Thus, the energy efficiency in the hybrid electric vehicle 1 can be increased.

Meanwhile, if, at Step S104, the vehicle ECU 22 judges that the upper limit decelerating torque Tu is smaller than the requested decelerating torque Tr, the vehicle ECU 22 engages the clutch 4 at Step S107.

When the clutch 4 is brought into the engaged state, if the revolution speed of the engine 2 differs from the revolution speed of the electric motor 6 to a great degree, it causes a great toque shock. Thus, in advance of engaging the clutch 4 at Step S107, the vehicle ECU 22 commands the engine ECU 24 to increase the revolution speed of the engine 2 to above the idle-speed so that the revolution speed of the engine 2 will almost agree with the revolution speed of the electric motor 6. According to this command, the engine ECU 24 increases the fuel supply to the engine 2, thereby increasing the revolution speed of the engine 2 to match it with the revolution speed of the electric motor 6.

After engaging the clutch 4 at Step S107, the vehicle ECU 22 commands the engine ECU 24 to stop the fuel supply to the engine 2 at Step S108. According to this command, the engine ECU 24 stops the fuel supply to the engine 2.

Then at Step S109, the engine ECU 22 sets a decelerating torque Tm to be generated by the electric motor 6, by subtracting a decelerating torque Te generated by the engine 2 to which the fuel supply has been stopped at Step S108, from the requested decelerating torque Tr set at Step S102.

Here, the decelerating torque Te generated by the engine 2 with the fuel supply stopped varies as the revolution speed of the engine 2 varies. Since the engine 2 is revolving together with the electric motor 6 through the clutch 4, the decelerating torque Te varies depending on the revolution speed of the electric motor 6. The relation between the decelerating torque Te of the engine 2 and the revolution speed of the electric motor 6 in this state is as shown in chain line in the upper graph of FIG. 3. The characteristics of the engine 2 and of the electric motor 6 are determined such that the sum of the decelerating torque Te of the engine 2 and the upper limit decelerating torque Tu of the electric motor 6 is equal to or greater than the requested decelerating torque Tr. Accordingly, it is ensured that the decelerating torque Tm of the electric motor 6 set at Step S109 is equal to or smaller than the upper limit decelerating torque Tu at the revolution speed of the electric motor 6 at that time, and therefore generable by the electric motor 6.

Next at Step S110, the vehicle ECU 22 commands the inverter ECU 26 to cause the electric motor 6 to generate the decelerating torque Tm set at Step S109 in the above-described manner. The inverter ECU 26 controls the electric motor 6 according to this command.

Consequently, the decelerating torque Te by the engine 2 and the decelerating torque Tm by the electric motor 6 are transmitted to the driving wheels 16 after being shifted to an appropriate speed, so that the vehicle decelerates. Here, since the sum of the decelerating torque Te by the engine 2 and the decelerating torque Tm by the electric motor 6 is equal to the requested decelerating torque Tr, the vehicle decelerates at an appropriate deceleration.

After the present control cycle is finished this way, the next control cycle is performed from Step S101 again. Specifically, the vehicle ECU 22 sets, at Steps S102 and S103, a requested decelerating torque Tr and an upper limit decelerating torque Tu corresponding to a revolution speed Nm of the electric motor 6 read at Step S101.

Then at Step S104, the vehicle ECU 22 again judges whether or not the upper limit decelerating torque Tu is equal to or greater than the requested decelerating torque Tr. If the upper limit decelerating torque Tu is still smaller than the requested decelerating torque Tr, the clutch 4 is kept engaged and the vehicle is decelerated by the decelerating torque of the engine 2 and the decelerating torque of the electric motor 6 in the above-described manner.

As described above, it is arranged such that when the requested decelerating torque Tr is greater than the upper limit decelerating torque Tu, namely the maximum decelerating torque generable by the electric motor 6, the clutch 4 is engaged so that the requested decelerating torque Tr is obtained as the sum of the decelerating torque of the engine 2 and the decelerating torque of the electric motor 6. This obviates the need to equip a larger electric motor 6 so that the requested decelerating torque Tr can be always obtained only by the electric motor 6, and therefore allows a reduction in vehicle weight and the space occupied by the electric motor 6.

Further, it is arranged such that when both the decelerating torque by the engine 2 and the decelerating torque by the electric motor 6 are used, the fuel supply to the engine 2 is stopped and the electric motor 6 is controlled to generate the decelerating torque Tm obtained by subtracting the decelerating torque Te of the engine 2 at that time from the requested decelerating torque Tr. This obviates useless fuel consumption when the vehicle is decelerated by using the engine 2 together with the electric motor 6, so that the fuel economy can be improved.

Meanwhile, if, at Step S104, the vehicle ECU 22 judges that the upper limit decelerating torque Tu is equal to or greater than the requested decelerating torque Tr, the vehicle ECU 22 disengages the clutch 4 at Step S105, and controls the electric motor 6 to obtain the requested decelerating torque Tr only from the decelerating torque of the electric motor 6, as already described above. Consequently, the vehicle decelerates.

When the accelerator pedal 30 is released while the vehicle is traveling, the vehicle is decelerated in the above-described manner. In this deceleration, the vehicle ECU 22 causes the transmission 8 to gradually downshift according to a decrease in the traveling speed detected by the vehicle speed sensor 34, following a gear shift map for downshifting set in advance.

The lower graph of FIG. 3 shows, in solid line, how the traveling speed of the vehicle and the revolution speed of the electric motor 6 change when the vehicle is decelerated on a virtually flat road. It is to be noted that in the lower graph of FIG. 3, straight lines drawn in chain line represent the relation between the traveling speed and the revolution speed of the electric motor 6 for each gear of the transmission 8. These straight lines will be hereinafter referred to as "speed-change lines". The gear shift map for downshifting is set such that when the traveling speed detected by the vehicle speed sensor 34 decreases to V4, V3, V2 and V1, the transmission 8 downshifts from the fifth to the fourth gear, from the fourth to the third gear, from the third to the second gear, and from the second to the first gear, respectively.

Referring to FIG. 3, suppose that the maximum practical traveling speed of the hybrid electric vehicle 1 is V5, and that while the vehicle is traveling on a virtually flat road with the fifth gear in use, the accelerator pedal 30 is released, so that the vehicle begins to be decelerated. As the traveling speed decreases, the revolution speed of the electric motor 6 decreases along the solid line on the speed-change line for the fifth gear. When the traveling speed decreases to V4, the vehicle ECU 22 causes the transmission 8 to downshift from the fifth to the fourth gear. Accordingly, the revolution speed of the electric motor 6 shifts from the speed-change line for the fifth gear to the speed-change line for the fourth gear, as indicated in solid line in FIG. 3, and therefore increases.

When the hybrid electric vehicle 1 continues to decelerate after the downshift to the fourth gear, the revolution speed of the electric motor 6 decreases along the solid line on the speed-change line for the fourth gear. When the traveling speed decreases to V3, the vehicle ECU 22 causes the transmission 8 to downshift from the fourth to the third gear. Accordingly, the revolution speed of the electric motor 6 shifts from the speed-change line for the fourth gear to the speed-change line for the third gear, as indicated in solid line in FIG. 3, and therefore increases.

When the hybrid electric vehicle 1 further continues to decelerate after the downshift to the third gear, the revolution speed of the electric motor 6 decreases along the solid line on the speed-change line for the third gear. When the traveling speed decreases to V2, the vehicle ECU 22 causes the transmission 8 to downshift from the third to the second gear. Accordingly, the revolution speed of the electric motor 6 shifts from the speed-change line for the third gear to the speed-change line for the second gear, as indicated in solid line in FIG. 3, and therefore increases.

Then, if the hybrid electric vehicle 1 continues to decelerate also after the downshift to the second gear, the revolution speed of the electric motor 6 decreases along the solid line on the speed-change line for the second gear. When the traveling speed decreases to V1, the vehicle ECU 22 causes the transmission 8 to downshift from the second to the first gear. Accordingly, the revolution speed of the electric motor 6 shifts from the speed-change line for the second gear to the speed-change line for the first gear, as indicated in solid line in FIG. 3, and therefore increases.

As described above, when the hybrid electric vehicle 1 traveling on the virtually flat road begins to be decelerated, the revolution speed of the electric motor 6 gradually decreases as the traveling speed decreases, although with repetitions of increase and decrease caused by downshifting. The variation region in which the revolution speed of the electric motor 6 varies in this deceleration is at and below the revolution speed Nr at the traveling speed V5.

Generally, the frequency that the vehicle travels on a virtually flat road is higher than the frequency that the vehicle travels on a non-flat road surface. Thus, the region at and below the revolution speed Nr is a normal revolution region for the hybrid electric vehicle 1 in deceleration. Thus, only when the vehicle needs to be decelerated with the electric motor 6 revolving at a relatively high speed, as on a downward slope, the revolution speed of the electric motor 6 exceeds this revolution speed Nr.

As seen in FIG. 3, the upper limit revolution speed Nr of such normal revolution region is lower than the revolution speed Nx at which the upper limit decelerating torque Tu agrees with the requested decelerating torque Tr. Thus, in the normal revolution region, the upper limit decelerating torque Tu is always greater than the requested decelerating torque Tr, and therefore, the requested decelerating torque Tr can be obtained only from the decelerating torque generated by regenerative braking of the electric motor 6, with the clutch 4 disengaged.

This reduces the frequency of clutch 4 operations during the vehicle deceleration, so that the lowering of durability of the clutch 4 due to wear and the lowering of a driving feeling due to increased oscillation and noise caused by frequent clutch 4 operations can be suppressed. Further, this reduces the frequency of matching of the revolution speed in the engine 2 required when the clutch 4 is engaged, so that the fuel economy can be improved.

It is to be noted that, in this first embodiment, as seen in FIG. 3, in order to ensure that the revolution speed Nx at which the upper limit decelerating torque Tu agrees with the requested decelerating torque Tr is above the upper limit revolution speed Nr of the normal revolution speed region, the requested decelerating torque Tr is slightly modified downward, near the revolution speed Nx. In other words, the rate of increase of the requested decelerating torque Tr relative to the revolution speed of the electric motor 6 is lowered, near the revolution speed Nx. This allows the setting of a greater revolution speed region in which the electric motor 6 can generate the requested decelerating torque Tr by itself.

The way of ensuring that the revolution speed Nx is above the upper limit revolution speed Nr is, however, not limited to the above-mentioned. This can be also ensured, for example by adjusting the gear ratios of the transmission 8 or modifying the upper limit decelerating torque Tu.

Next, referring to the drawings, a second embodiment of the present invention will be described below.

As in the case of the first embodiment, a hybrid electric vehicle to which the second embodiment is applied has a structure as shown in FIG. 1. In the following, for the same components as those of the first embodiment, the same reference signs will be used, and the explanation of each component will be omitted.

The second embodiment differs from the first embodiment only in the controls performed by the vehicle ECU 22 in deceleration. In respect of controls other than the controls in deceleration which will be described below, the second embodiment is the same as the first embodiment, so that the explanation of such controls will be omitted.

Figure 4:
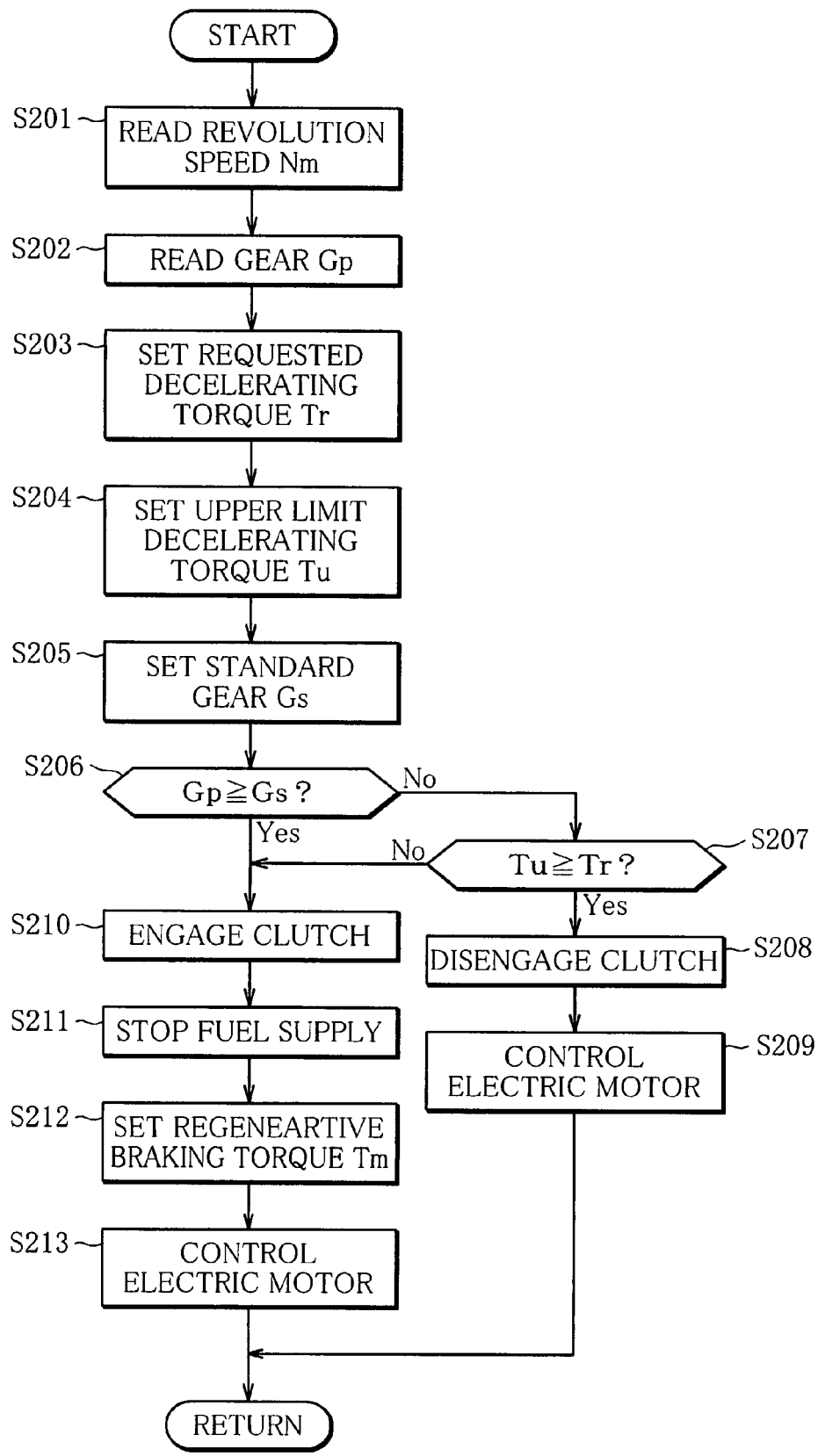
FIG. 4 is a flow chart showing a control routine for deceleration, performed in the second embodiment.

When the accelerator pedal 30 is released, the vehicle ECU 22 performs, in place of the flow chart of FIG. 2 used in the first embodiment, a control routine for deceleration according a flow chart of FIG. 4, at intervals of a predetermined control period.

First at Step S201, the vehicle ECU 22 reads a revolution speed Nm of the electric motor 6 detected by the revolution speed sensor 36, and then at Step S202, detects a gear in present use Gp based on information fed from the transmission 8 (gear detection means).

Then at Step S203, the vehicle ECU 22 sets a requested decelerating torque Tr, namely a torque to be transmitted to the transmission 8 to obtain an appropriate deceleration of the hybrid electric vehicle 1, on the basis of the revolution speed Nm of the electric motor 6 read at Step S201 and the gear in present use Gp detected at Step S202.

Figure 5:
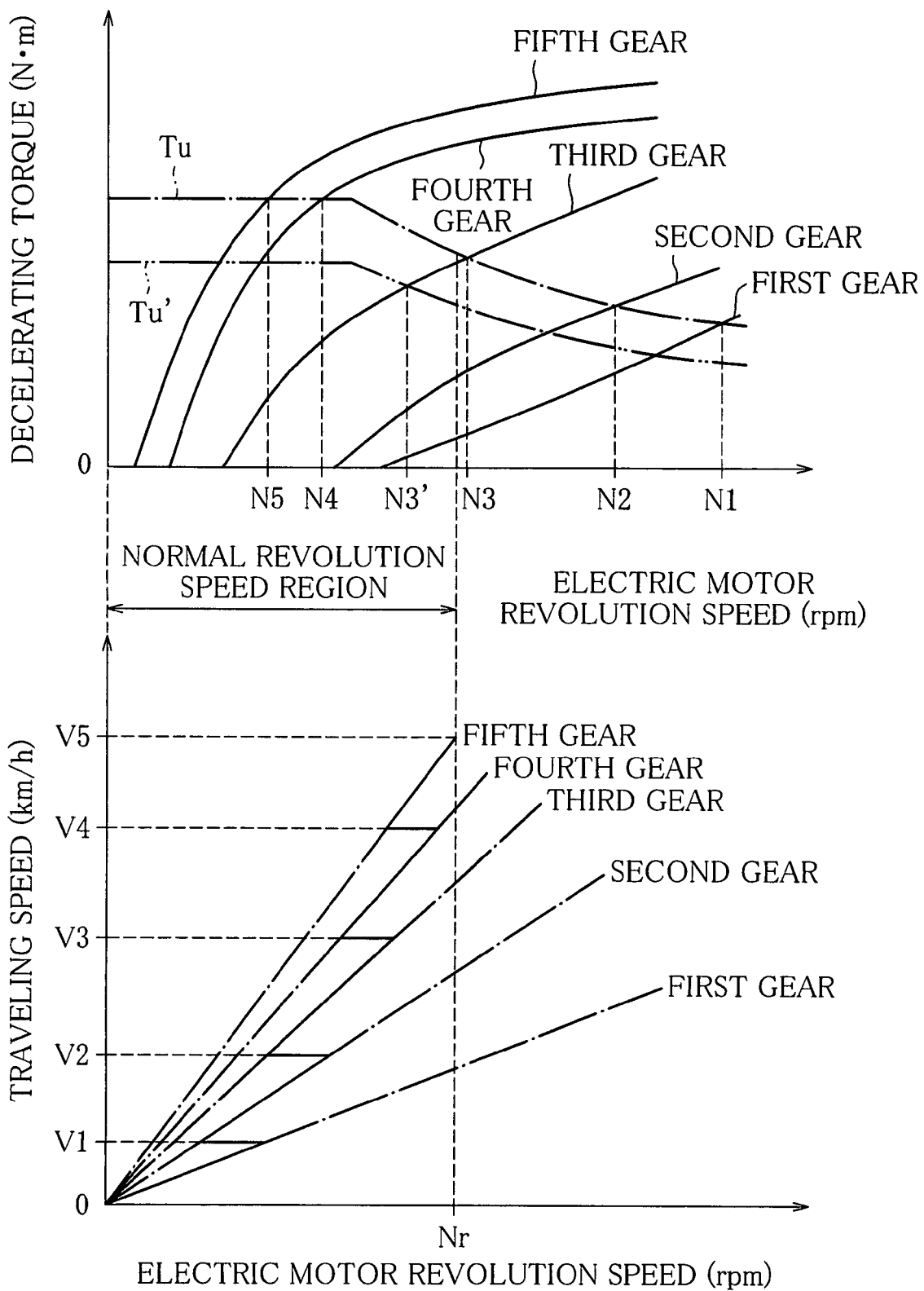
FIG. 5 is a diagram showing a relation between upper limit decelerating torque and requested decelerating torque, used in the second embodiment, and also showing, in a manner associated with the this relation, how the revolution speed of an electric motor changes as the traveling speed of a vehicle decreases in vehicle deceleration.

The requested decelerating torque Tr is set for each of the gears of the transmission 8, separately, as shown in solid line in the upper graph of FIG. 5. The requested decelerating torque Tr for each gear has a characteristic that it increases as the revolution speed of the electric motor 6 increases. As seen in FIG. 5, for the gear for the higher speed, the greater requested decelerating torque Tr is set.

By setting the greater requested decelerating torque for the gear for the higher speed, difference in the decelerating torque transmitted to the driving wheels by each gear of the transmission 8 can be reduced. Therefore, difference in the deceleration obtained by using each gear and shift shock caused by downshifting can be reduced.

The vehicle ECU 22 has such requested decelerating torque Tr stored in advance, and at Step S203, reads and sets a requested decelerating torque Tr corresponding to the revolution speed Nm of the electric motor 6 and the gear in present use Gp.

Then at Step S204, the vehicle ECU 22 sets an upper limit decelerating torque Tu, namely a maximum regenerative braking torque generable by the electric motor 6 at the revolution speed Nm of the electric motor 6 read at Step S201. The upper limit decelerating torque Tu is determined relative to the revolution speed of the electric motor 6, depending on the specifications of the electric motor 6. As seen from the upper graph of FIG. 5 showing the upper limit decelerating torque Tu in chain line, the upper limit decelerating torque Tu has a characteristic that it is constant in the lower revolution speed region, and decreases along with the increase of the revolution speed of the electric motor 6 in the higher revolution speed region.

As seen in FIG. 5, the requested decelerating torque Tr for the first gear is equal to or smaller than the upper limit decelerating torque Tu at and below a revolution speed N1 of the electric motor 6, and greater than the upper limit decelerating torque Tu above the revolution speed N1 of the electric motor 6. Regarding the requested decelerating torques Tr for the second to fifth gears, the magnitude relation between the requested decelerating torque Tr and the upper limit decelerating torque Tu is likewise reversed at the revolution speeds N2, N3, N4 and N5 of the electric motor 6, respectively.

The vehicle ECU 22 has such upper limit decelerating torque Tu stored in advance, and reads and sets an upper limit decelerating torque Tu corresponding to the revolution speed Nm of the electric motor 6 read at Step S201.

It is to be noted that when the SOC of the battery 18 has risen to such a high level that it can lead to overcharge, or when there is a possibility of the electric motor 6 or the battery 18 overheating, the upper limit decelerating torque Tu as shown in FIG. 5 may not be able to be generated, since the regenerative braking of the electric motor 6 is restricted.

Thus, in the setting of the upper limit decelerating torque at Step S204, the vehicle ECU 22 judges whether or not the upper limit decelerating torque needs to be corrected downward, on the basis of information representing operating conditions of the electric motor 6. The information representing operating conditions of the electric motor 6 includes the temperature of the electric motor 6, the SOC of the battery 18 and the temperature of the battery 18 fed from the inverter ECU 26 and the battery ECU 28.

When the vehicle ECU 22 judges that the downward correction is not required, the vehicle ECU 22 sets an upper limit decelerating toque Tu in accordance with a characteristic curve of the upper limit decelerating toque Tu drawn in chain line in FIG. 5 without change. Meanwhile, when the vehicle ECU 22 judges that the downward correction is required, the vehicle ECU 22 sets an upper limit decelerating toque Tu' in accordance with a characteristic curve of the upper limit decelerating toque drawn in two-dot chain line in FIG. 5, which is obtained by downward-correcting the characteristic curve of the upper limit decelerating toque Tu drawn in chain line in FIG. 5, on the basis of the above-mentioned information.

The controls performed using the corrected upper limit decelerating toque Tu' will be described later. First, the controls performed using the upper limit decelerating toque Tu without the downward correction will be described below.

At Step S205, the vehicle ECU 22 sets a standard gear (predetermined gear) Gs, on the basis of the characteristic curve of the requested decelerating torque Tr which was used to set the requested decelerating torque Tr at Step S203, and the characteristic curve of the upper limit decelerating torque Tu which was used to set the upper limit decelerating torque Tu at Step S204. The standard gear Gs is the gear for the lowest speed of all those gears for which the magnitude relation between the upper limit decelerating torque Tu and the requested decelerating torque Tr is reversed within the variation region in which the revolution speed of the electric motor 6 varies when the vehicle is decelerated on the virtually flat road. The setting of the standard gear Gs will be described below in detail.

When the accelerator pedal 30 is released during the vehicle traveling and the vehicle is decelerated, the vehicle ECU 22 causes the transmission 8 to gradually downshift according to a decrease in the traveling speed detected by the vehicle speed sensor 34, following a gear shift map for downshifting set in advance.

The lower graph of FIG. 5 shows, in solid line, how the traveling speed of the vehicle and the revolution speed of the electric motor 6 change when the vehicle is decelerated on the virtually flat road. It is to be noted that in the lower graph of FIG. 5, straight lines drawn in chain line represent the relation between the traveling speed and the revolution speed of the electric motor 6 for each gear of the transmission 8. These straight lines will be hereinafter referred to as "speed-change lines". The gear shift map for downshifting is set such that when the traveling speed detected by the vehicle speed sensor 34 decreases to V4, V3, V2 and V1, the transmission 8 downshifts from the fifth to the fourth gear, from the fourth to the third gear, from the third to the second gear, and from the second to the first gear, respectively.

Referring to FIG. 5, suppose that the maximum practical traveling speed of the hybrid electric vehicle 1 is V5, and that while the vehicle is traveling on a virtually flat road with the fifth gear in use, the accelerator pedal 30 is released, so that the vehicle begins to be decelerated. As the traveling speed decreases, the revolution speed of the electric motor 6 decreases along the solid line on the speed-change line for the fifth gear. When the traveling speed decreases to V4, the vehicle ECU 22 causes the transmission 8 to downshift from the fifth to the fourth gear. Accordingly, the revolution speed of the electric motor 6 shifts from the speed-change line for the fifth gear to the speed-change line for the fourth gear, as indicated in solid line in FIG. 5, and therefore increases.

When the vehicle continues to decelerate after the downshift to the fourth gear, the revolution speed of the electric motor 6 decreases along the solid line on the speed-change line for the fourth gear. When the traveling speed decreases to V3, the vehicle ECU 22 causes the transmission 8 to downshift from the fourth to the third gear. Accordingly, the revolution speed of the electric motor 6 shifts from the speed-change line for the fourth gear to the speed-change line for the third gear, as indicated in solid line in FIG. 5, and therefore increases.

When the vehicle further continues to decelerate after the downshift to the third gear, the revolution speed of the electric motor 6 decreases along the solid line on the speed-change line for the third gear. When the traveling speed decreases to V2, the vehicle ECU 22 causes the transmission 8 to downshift from the third to the second gear. Accordingly, the revolution speed of the electric motor 6 shifts from the speed-change line for the third gear to the speed-change line for the second gear, as indicated in solid line in FIG. 5, and therefore increases.

Then, if the vehicle continues to decelerate also after the downshift to the second gear, the revolution speed of the electric motor 6 decreases along the solid line on the speed-change line for the second gear. When the traveling speed decreases to V1, the vehicle ECU 22 causes the transmission 8 to downshift from the second to the first gear. Accordingly, the revolution speed of the electric motor 6 shifts from the speed-change line for the second gear to the speed-change line for the first gear, as indicated in solid line in FIG. 5, and therefore increases.

As described above, when the hybrid electric vehicle 1 traveling on the virtually flat road begins to be decelerated, the revolution speed of the electric motor 6 gradually decreases as the traveling speed decreases, although with repetitions of increase and decrease caused by downshifting. In this deceleration, the maximum revolution speed of the electric motor 6 is Nr at the traveling speed V5.

Thus, as in the first embodiment, the region at and below this revolution speed Nr is the normal revolution speed region in the deceleration of the vehicle. Thus, only when the vehicle needs to be decelerated with the electric motor 6 revolving at a relatively high speed, as on a downward slope, the revolution speed of the electric motor 6 exceeds this revolution speed Nr.

According to the relation between the characteristic curve of the upper limit decelerating torque Tu drawn in chain line and the characteristic curve of the requested decelerating torque Tr drawn in solid line in FIG. 5, there are 2 gears, namely the forth gear and the fifth gear, for which the magnitude relation between the upper limit decelerating torque Tu and the requested decelerating torque Tr is reversed within such normal revolution speed region. That is, the magnitude relation between the upper limit decelerating torque Tu and the requested decelerating torque Tr for the forth gear is reversed at the revolution speed N4 of the electric motor 6 and the magnitude relation between the upper limit decelerating torque Tu and the requested decelerating torque Tr for the fifth gear is reversed at the revolution speed N5 of the electric motor 6.

At Step S205, the vehicle ECU 22 sets, as the standard gear Gs, the gear for the lowest speed of all those gears for which the magnitude relation between the upper limit decelerating torque Tu and the requested decelerating torque Tr is reversed within the normal revolution speed region, namely the fourth gear in the present case.

After Step S205, at Step S206, the vehicle ECU 22 judges whether or not the gear in present use Gp detected at Step S202 is the standard gear Gs set at Step S205 or a gear for a higher speed than the standard gear Gs. Since the standard gear Gs set at Step S205 this time is the fourth gear, if the gear in present use is among the first to third gears, the vehicle ECU 22 advances the procedure to Step S207, and if it is the fourth or fifth gear, the vehicle ECU 22 advances the procedure to Step S210.

First, suppose that the gear in present use is among the first to third gears. Then, the vehicle ECU 22 advances the procedure to Step S207, where the vehicle ECU 22 judges whether or not the upper limit decelerating torque Tu set at Step S204 is equal to or greater than the requested decelerating torque Tr set at Step S203.

When the vehicle ECU 22 judges that the upper limit decelerating torque Tu is equal to or greater than the requested decelerating torque Tr, the requested decelerating torque Tr is generable only by the electric motor 6. Thus, the vehicle ECU 22 disengages the clutch 4 at Step S208. Then, at Step S209, the vehicle ECU 22 commands the inverter ECU 26 to control the electric motor 6 to generate a regenerative braking torque equal to the requested decelerating torque Tr. With this, the control cycle this time is finished.

Receiving the command form the vehicle ECU 22, the inverter ECU 26 operates the electric motor 6 as an electric generator and adjusts the power supplied from the electric motor 6 to the battery 18 by means of the inverter 20, thereby controlling the electric motor 6 to generate a regenerative braking torque equal to the requested decelerating torque Tr.

After the present control cycle is finished this way, the next control cycle is performed from Step S201 again. Specifically, the vehicle ECU 22 reads a revolution speed Nm of the electric motor 6 detected by the revolution speed sensor 36 at Step S201, and detects a gear in present use Gp at Step S202. Then at Steps S203 and S204, the vehicle ECU 22 sets a requested decelerating torque Tr and an upper limit decelerating torque Tu corresponding to the revolution speed Nm of the electric motor 6.

Then, at Step S205, the vehicle ECU 22 sets a standard gear Gs, on the basis of the characteristic curve of the requested decelerating torque Tr which has been used to set the requested decelerating torque Tr at Step S203, and the characteristic curve of the upper limit decelerating torque Tu which has been used to set the upper limit decelerating torque Tu at Step S204. Then at Step S206, the vehicle ECU 22 judges whether or not the gear in present use Gp is the standard gear Gs or a gear for a higher speed than the standard gear Gs.

When at Step S206, the vehicle ECU 22 judges that the gear in present use Gp is still a gear for a lower speed than the standard gear Gs, then the vehicle ECU judges at Step S207 whether or not the upper limit decelerating torque Tu is equal to or greater than the requested decelerating torque Tr.

Thus, as long as the gear in present use Gp is a gear for a lower speed than the standard gear Gs and the upper limit decelerating torque Tu is equal to or greater than the requested decelerating torque Tr, the clutch is disengaged and the electric motor 6 is controlled to generate a regenerative braking torque equal to the requested decelerating torque Tr. Consequently, the hybrid electric vehicle 1 decelerates.

Meanwhile, if the upper limit decelerating torque Tu set at Step S204 is smaller than the requested decelerating torque Tr set at Step S203, the electric motor 6 cannot generate a regenerative braking torque equal to the requested decelerating torque Tr, by itself. Thus, after Step S207, the vehicle ECU 22 engages the clutch 4 at Step S210, and then advances the procedure to Step S211.

At Step S211, the vehicle ECU 22 commands the engine ECU 24 to stop the fuel supply to the engine 2. According to this command, the engine ECU 24 stops the fuel supply to the engine 2.

Then at Step S212, the vehicle ECU 22 sets a regenerative braking torque Tm to be generated by the electric motor 6, by subtracting a decelerating torque Te generated by the engine 2 to which the fuel supply has been stopped at Step S211, from the requested decelerating torque Tr set at Step S203, and then advances the procedure to Step S213.

At Step S213, the vehicle ECU 22 commands the inverter ECU 26 to control the electric motor 6 to generate the regenerative braking torque Tm set at Step S212 in the described manner. According to this command, the inverter ECU 26 controls the electric motor 6, and then the present control cycle is finished.

Consequently, the decelerating torque Te generated by the engine 2 with the fuel supply stopped and the regenerative braking torque Tm generated by the electric motor 6 operated as a generator are transmitted to the transmission 8, and transmitted to the driving wheels 16 after having a speed change by the transmission 8, so that the vehicle decelerates. Here, since the sum of the decelerating torque Te of the engine 2 and the regenerative braking torque Tm of the electric motor 6 is equal to the requested decelerating torque Tr, the vehicle is decelerated at an appropriate deceleration.

Also in the next control cycle, the vehicle ECU 22 sets a requested decelerating torque Tr and an upper limit decelerating torque Tu in the above-described manner, and sets a standard gear Gs at Step S205. Then, if, at Step S206, the vehicle ECU 22 judges that the gear in present use Gb is still a gear for a lower speed than the standard gear Gs, the vehicle ECU 22 judges, at Step S207, whether or not the upper limit decelerating torque Tu is equal to or greater than the requested decelerating torque Tr.

If the upper limit decelerating torque Tu is still smaller than the requested decelerating torque Tr, the clutch 4 is kept engaged, and the engine 2 and the electric motor 6 are controlled so that the sum of the decelerating torque Te of the engine 2 and the regenerative braking torque Tm of the electric motor 6 is equal to the requested decelerating torque Tr, in the already described manner. Consequently, the hybrid electric vehicle 1 is decelerated by both the engine 2 and the electric motor 6.

If the upper limit decelerating torque Tu is equal to or greater than the requested decelerating torque Tr, the clutch 4 is disengaged at Step S208, so that the hybrid electric vehicle 1 is decelerated by only the regenerative braking force of the electric motor 6 being transmitted to the transmission 8, as already described above.

Thus, in the situation where the gear in present use Gp is a gear for a lower speed than the standard gear Gs, a switch between the deceleration by the engine 2 and the electric motor 6 and the deceleration only by the electric motor 6 is made by controlling the engaged/disengaged state of the clutch 4 depending on whether or not the upper limit decelerating torque Tu is equal to or greater than the requested decelerating torque Tr.

In the present case, as seen in FIG. 5, the revolution speeds N1, N2 and N3, above which the upper limit decelerating torque Tu is smaller than the requested decelerating torque Tr, are above the normal revolution speed region for the electric motor 6 in deceleration. Thus, for example when the vehicle is decelerated on the virtually flat road, the clutch 4 is kept disengaged and the vehicle is decelerated by only the regenerative braking torque of the electric motor 6 being transmitted to the transmission 8, as a decelerating torque. Only when a gear for a lower speed is kept in use and the revolution speed of the electric motor 6 increases to above the normal revolution speed region, as in deceleration on the downward slope, there is a possibility that the upper limit decelerating torque Tu becomes smaller than the requested decelerating torque Tr, so that the clutch 4 is engaged.

Thus, as long as the gear in present use Gp is a gear for a lower speed than the standard gear Gs, even if the clutch is engaged/disengaged depending on the magnitude relation between the upper limit decelerating torque Tu and the requested decelerating torque Tr, the frequency of clutch 4 operations is low, so that the lowering of the driving feeling can be avoided.

Meanwhile, if the gear in present use Gp detected at Step S202 is the standard gear Gs set at Step S205 or a gear for a higher speed than the standard gear Gs, namely the fourth or fifth gear, the vehicle ECU 22 does not advance the procedure to Step S207 but advances to Step S210 directly after Step S206. At Step S210, the clutch 4 is engaged, and at Step S211, the fuel supply to the engine 2 is stopped. Then at Steps S212 and S213, the engine 2 and the electric motor 6 are controlled so that the sum of the decelerating torque Te of the engine 2 and the regenerative braking torque Tm of the electric motor 6 is equal to the requested decelerating torque Tr, in the already described manner.

Also in the next and succeeding control cycles, as long as the gear in present use Gp is the standard gear Gs or a gear for a higher speed than the standard gear Gs, the vehicle ECU 22 advances the procedure from Step S206 to Step S210. Consequently, the clutch 4 is kept engaged at Step S210, and the fuel supply to the engine 2 is stopped at Step S211. Further, at Steps S212 and S213, the engine 2 and the electric motor 6 are controlled so that the sum of the decelerating torque Te of the engine 2 and the regenerative braking torque Tm of the electric motor 6 is equal to the requested decelerating torque Tr.

Thus, as long as the gear in present use Gp is the standard gear Gs or a gear for a higher speed than the standard gear Gs, not only when the upper limit decelerating torque Tu is smaller than the requested decelerating torque Tr but also when the upper limit decelerating torque Tu is equal to or greater than the requested decelerating torque Tr, the clutch 4 is engaged.

As mentioned above, when the upper limit torque Tu is set using the characteristic curve of the upper limit decelerating torque Tu without downward correction, the standard gear Gs is the fourth gear. Thus, when the gear in present use is the fourth or fifth gear, the clutch 4 is engaged regardless of the magnitude relation between the upper limit decelerating torque Tu and the requested decelerating torque Tr.

As seen in FIG. 5, the magnitude relation between the upper limit decelerating torque Tu and the requested decelerating torque Tr is reversed at the revolution speed N4 for the fourth gear, and at the revolution speed N5 for the fifth gear. These revolution speeds N4 and N5 are within the normal revolution speed region in the vehicle deceleration. Hence, if it is arranged such that the clutch is engaged/disengaged depending on the magnitude relation between the upper limit decelerating torque Tu and the requested decelerating torque Tr, as is the case with the first to third gears, the clutch 4 is switched between engagement and disengagement even when the vehicle is decelerated on the virtually flat road, which causes the lowering of the driving feeling.

In the second embodiment, however, as long as the gear in present use is the standard gear Gs, namely the fourth gear, or a gear for a higher speed than the standard gear Gs, the clutch 4 is kept engaged regardless of the magnitude relation between the upper limit decelerating torque Tu and the requested decelerating torque Tr, as described above. This reduces the frequency of clutch 4 operations, so that the driving feeling can be improved.

It is to be noted that in such vehicle deceleration, the vehicle ECU 22 performs a control to change gears of the transmission 8 as necessary, apart from the above-described controls. In this connection, the vehicle ECU 22 performs a clutch 4 engagement/disengagement control, as necessary. The clutch 4 engagement/disengagement control accompanying the change of gears of the transmission 8 is performed independently of the above-described controls.

Next, description will be given of the case where the characteristic curve of the upper limit decelerating torque is downward-corrected in the setting of the upper limit decelerating torque at Step S204, since the regenerative braking of the electric motor 6 needs to be restricted because of the rise of the SOC of the battery 18, or the possibility of the overheating of the electric motor 16 or the battery 18.

In such case, as mentioned above, the vehicle ECU 22 sets an upper limit decelerating torque Tu' according to a characteristic curve obtained by downward-correcting the characteristic curve of the upper limit decelerating torque Tu on the basis of information such as the temperature of the electric motor 6, the SOC of the battery 18, the temperature of the battery 18, etc. In FIG. 5, an example of the downward-corrected characteristic curve of the upper limit decelerating torque Tu' is given in two-dot chain line. It may be arranged such that the amount of the downward correction is appropriately varied according to the state of the electric motor 6 and of the battery 18, instead of being fixed.

After setting the upper limit decelerating torque Tu' at Step S204 in this manner, the vehicle ECU 22 sets, at Step S205, a standard gear Gs, on the basis of the characteristic curve of the requested decelerating torque Tr which has been used to set the requested decelerating torque Tr at Step S203, and the characteristic curve of the upper limit decelerating torque Tu' which has been used to set the upper limit decelerating torque Tu' at Step S204.

As seen in FIG. 5, the characteristic curve of the upper limit decelerating torque Tu' is below the characteristic curve of the upper limit decelerating torque Tu. Thus, not only for the first and fifth gears but also for the third gear, the magnitude relation between the upper limit decelerating torque Tu' and the requested decelerating torque Tr is reversed at the revolution speed N3' of the electric motor 6, which is within the normal revolution speed region. In other words, for the third to fifth gears, the revolution speed of the electric motor 6 at which the magnitude relation between the upper limit decelerating torque Tu' and the requested decelerating torque Tr is reversed is present within the normal revolution speed region. Thus, the third gear, which is a gear for the lowest speed of these three gears, is set as a standard gear Gs.

After setting the standard gear Gs at Step S205 in this manner, the vehicle ECU 22 judges, at Step S206, whether or not the gear in present use Gp is the standard gear Gs or a gear for a higher speed than the standard gear Gs.

The controls performed at Steps S210 to S213 when the vehicle ECU 22 judges at Step S206 that the gear in present use Gp is the standard gear Gs or a gear for a higher speed than the standard gear Gs are as described above. Specifically, since the standard gear Gs is the third gear, when the gear in present use is among the third to fifth gears, the clutch is kept engaged regardless of the magnitude relation between the upper limit decelerating torque Tu' and the requested decelerating torque Tr.

If it is arranged such that the clutch 4 is engaged/disengaged depending only on the magnitude relation between the upper limit decelerating torque Tu' obtained by downward-correcting the upper limit decelerating torque Tu and the requested decelerating torque Tr, the clutch 4 is operated within the normal revolution speed region also when the vehicle is decelerated with third gear in use, which causes the lowering of the driving feeling. However, by setting the standard gear Gs on the basis of the downward-corrected upper limit torque Tu' as described above, it can be arranged such that also when the third gear is in use, the clutch 4 is kept engaged regardless of the magnitude relation between the upper limit decelerating torque Tu' and the requested decelerating torque Tr. This can bring an improvement of the driving feeling.

It is to be noted that the above description relates to the example in which the upper limit decelerating torque Tu is downward-corrected to the upper limit torque Tu', so that the third gear is set as the standard gear Gs. If the upper limit decelerating torque Tu is further downward-corrected so that the magnitude relation between the requested decelerating torque for the second gear and the upper limit decelerating torque is reversed at a revolution speed of the electric motor 6 within the normal revolution speed region, the second gear is set as the standard gear Gs. In this case, as long as the vehicle is decelerated with the second gear or a gear for a higher speed than the second gear in use, the clutch 4 is kept engaged regardless of the magnitude relation between the upper limit decelerating torque and the requested decelerating torque Tr. This can likewise bring an improvement of the driving feeling.

If the upper limit decelerating torque Tu is further downward-corrected so that the magnitude relation between the requested decelerating torque for the first gear and the upper limit decelerating torque at a revolution speed of the electric motor 6 within the normal revolution speed region, the first gear is set as the standard gear Gs. In this case, whichever gear is in use in the deceleration, the clutch is kept engaged regardless of the magnitude relation between the upper limit decelerating torque and the requested decelerating torque Tr. This can likewise bring an improvement of the driving feeling.

In the above, the first and second embodiments of the control device for the hybrid electric vehicle according to the present invention have been described. The present invention is, however, not limited to the described embodiments.

For example, in the described embodiments, when the decelerating torque of the engine 2 is used together with the decelerating torque of the electric motor 6, the fuel supply to the engine 2 is stopped. It may be arranged such that in addition to this, an exhaust brake device, which is provided in the exhaust passage of the engine 2, is operated so that a greater decelerating torque can be obtained.

In the described embodiments, the upper limit decelerating torque Tu and the requested decelerating torque Tr are set on the basis of the revolution speed of the electric motor 6 detected by the revolution speed sensor 36. It may be, however, modified such that, in place of the revolution speed of the electric motor 6, revolution speed which varies according to the variation of the revolution speed of the electric motor 6, such as the output revolution speed of the transmission 8 is detected, and then converted to the revolution speed of the electric motor 6 for use.

In the described embodiments, the engine 2 is a diesel engine. The type of the engine is, however, not limited to this, but can be a gasoline engine, for example.

In the described embodiments, the electric motor 6 is a permanent-magnet synchronous electric motor. The type of the electric motor is, however, not limited to this, but may be any that can be operated as an motor and as a generator.

In the described embodiments, the transmission 8 is an automatic transmission having five forward gears. The number of the forward gears as well as the type of the transmission is, however, not limited to this. The transmission may be a continuously variable transmission, a manual transmission or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control device for a hybrid electric vehicle arranged such that a driving force of an engine and a driving force of an electric motor can be transmitted to driving wheels through a transmission and that the engine and the transmission can be mechanically connected and disconnected by means of a clutch, comprising:

a revolution speed detection means for detecting revolution speed of the electric motor; and a control means which, in deceleration of the vehicle, sets an upper limit decelerating torque generable by the electric motor and a requested decelerating torque to be obtained from the engine and the electric motor, on the basis of a revolution speed detected by the revolution speed detection means, and when the upper limit decelerating torque is equal to or greater than the requested decelerating torque, disengages the clutch and controls the electric motor to generate the requested decelerating torque, and when the upper limit decelerating torque is smaller than the requested decelerating torque, engages the clutch and controls the engine and the electric motor so that the sum of a decelerating torque generated by the engine and a decelerating torque generated by the electric motor is equal to the requested decelerating toque.

2. The control device for the hybrid electric vehicle according to claim 1, wherein:
when the upper limit decelerating torque is smaller than the requested decelerating torque, the control means stops fuel supply to the engine and controls the electric motor to generate a decelerating torque equal to a difference between the requested decelerating torque and a decelerating toque generated by the engine with the fuel supply stopped.

3. The control device for the hybrid electric vehicle according to claim 1, wherein:
the transmission is an automatic transmission designed to downshift according to a decrease in traveling speed of the vehicle in deceleration; and
when the revolution speed detected by the revolution speed detection means is higher than a predetermined revolution speed which is above a variation region in which the revolution speed of the electric motor varies when the vehicle is decelerated on a flat road, the control means sets the requested decelerating torque such that the requested decelerating torque is greater than the upper limit decelerating toque, and when the revolution speed detected by the revolution speed detection means is equal to or lower than the predetermined revolution speed, the control means sets the requested decelerating torque such that the requested decelerating torque is equal to or smaller than the upper limit decelerating toque.

4. The control device for the hybrid electric vehicle according to claim 3, wherein:
the requested decelerating torque is set such that the requested decelerating torque increases as the revolution speed of the electric motor increases, where the rate of increase of the requested decelerating torque is lower in a predetermined region which is near and below the predetermined revolution speed, than in the other region.

5. The control device for the hybrid electric vehicle according to claim 1, wherein:
the transmission has a plurality of forward gears;
the control device further comprises a gear detection means for detecting a forward gear of the transmission in use; and
the control means sets the requested decelerating torque depending on the gear in use detected by the gear detection means, and when the gear in use detected by the gear detection means is a predetermined gear or a gear for a higher speed than the predetermined gear, the control means engages the clutch even if the upper limit decelerating torque is equal to or greater than the requested decelerating torque.

6. The control device for the hybrid electric vehicle according to claim 5, wherein:
the transmission is an automatic transmission designed to downshift according to the traveling speed of the vehicle in deceleration; and
the pre determined gear is a gear for the lowest speed of all those gears for which magnitude relation between the upper limit decelerating torque and the requested decelerating torque is reversed within a variation region in which the revolution speed of the electric motor varies when the vehicle is decelerated on a flat road.

7. The control device for the hybrid electric vehicle according to claim 6, wherein:
the control means sets the upper limit decelerating torque by correcting a regenerative braking torque generable by the electric motor depending on the revolution speed of the electric motor, by taking account of operating conditions of the electric motor other than the revolution speed, and chooses, as the predetermined gear, a gear for the lowest speed of all those gears for which magnitude relation between the corrected upper limit decelerating torque and the requested decelerating torque is reversed within the variation region.

* * * * *